Sept. 11, 1928.  W. S. SMITH ET AL  1,684,117
TELEGRAPH SYSTEM AND CIRCUIT ARRANGEMENT THEREFOR
Filed Jan. 21, 1928  2 Sheets-Sheet 1

INVENTORS:
W. S. SMITH,
N. W. McLACHLAN,
W. G. R. JACOB,
By their Attorneys,
Baldwin Wright Sept. 11, 1928.　　　　　　　　　　　　　　　　　　　　1,684,117
W. S. SMITH ET AL
TELEGRAPH SYSTEM AND CIRCUIT ARRANGEMENT THEREFOR
Filed Jan. 21, 1928　　　2 Sheets-Sheet 2
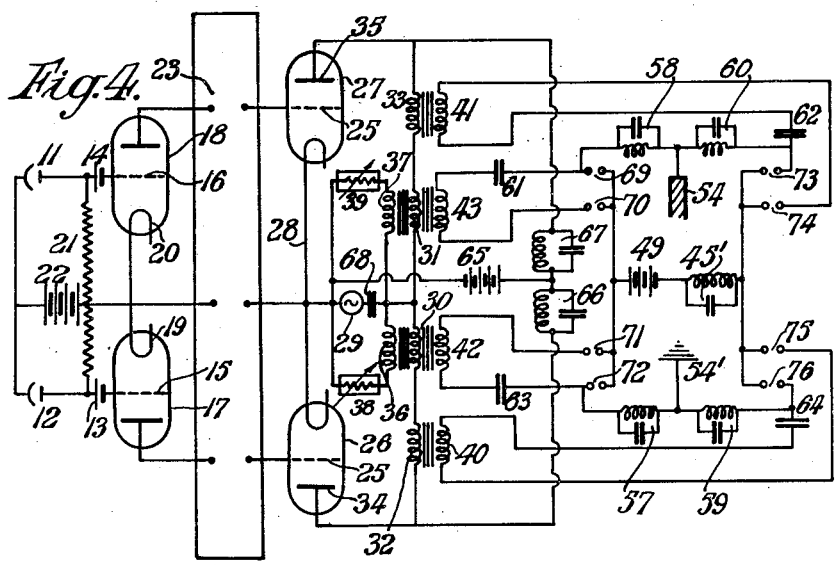
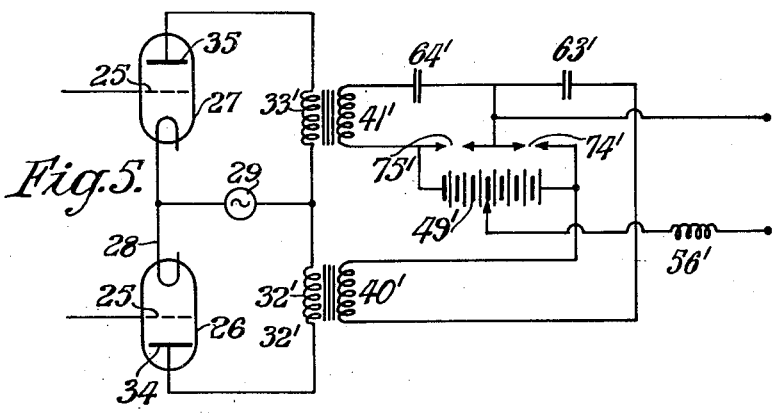
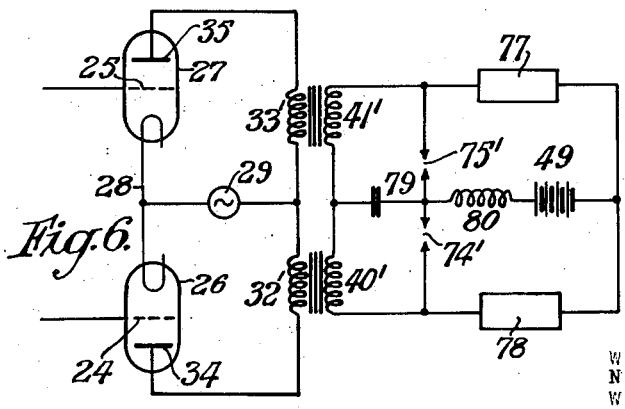
INVENTORS:
W. S. SMITH,
N. W. McLACHLAN,
W. G. R. JACOB,
By their Attorneys Patented Sept. 11, 1928.

1,684,117

UNITED STATES PATENT OFFICE.

WILLOUGHBY STATHAM SMITH, OF NEWTON POPPLEFORD, AND NORMAN WILLIAM McLACHLAN AND WILLIAM GORDON REED JACOB, OF LONDON, ENGLAND.

TELEGRAPH SYSTEM AND CIRCUIT ARRANGEMENT THEREFOR.

Application filed January 21, 1928, Serial No. 248,462, and in Great Britain September 21, 1926.

This invention relates to telegraph systems and circuit arrangements therefor, and has for its princpal objects to provide a telegraph system in which the ratio of marking to spacing may be readily adjusted, and maintained at a constant desired value, and in which there shall be a minimum of mechanically moving reciprocating parts.

According to one feature of the invention a telegraph transmitter comprises one or more sources of radiation, means for interrupting the radiaton from the said source or sources, a telegraph tape or tapes or the like signalling device or devices associated with the said means and adapted to prevent or permit the passage of radiation after it has passed through the same means, a receiver sensitive to radiation in the path or paths of the radiation, and means, preferably adjustable, for limiting the period during which radiation may be allowed to fall upon the said receiver or receivers.

According to another feature of the invention, means for transmitting and/or receiving telegraph signals comprises one or more spark gaps and electrical means actuated by the signals for controlling the passage of current across the said spark gaps.

Figure 1:
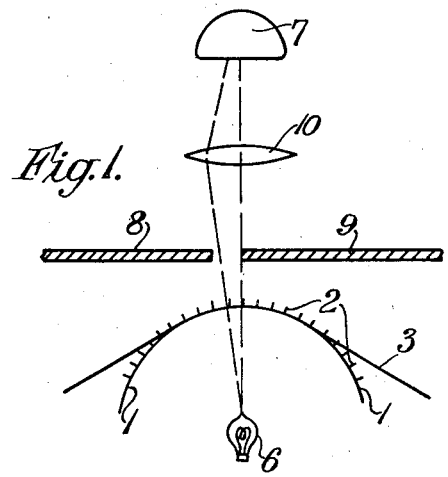
Figure 2:
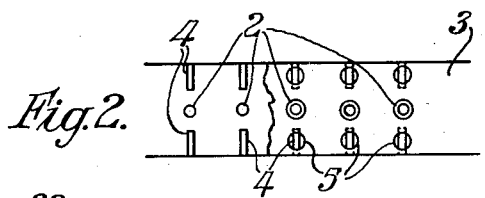
Figure 3:
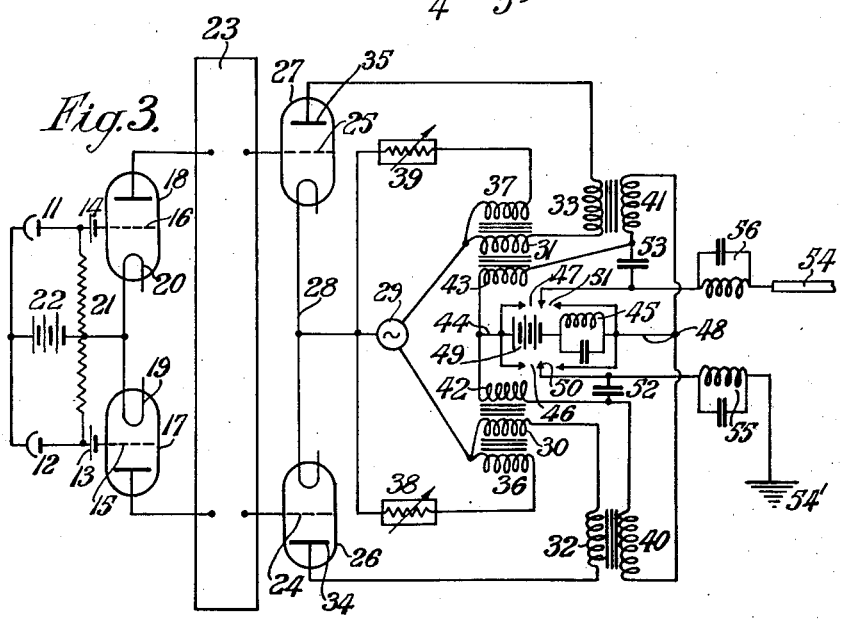

The invention is illustrated in the accompanying drawings wherein:

Figure 1 is a diagrammatic illustration of the arrangement of the transmitting apparatus of our invention; Fig. 2 is a plan view of the transmitter shown in Fig. 1; Fig. 3 shows a wiring diagram of a transmission circuit embodying the principles of our invention; Fig. 4 shows the circuit arrangement of our inventon equipped with suitable rejector circuits and arranged for the operation of the valves at substantially the mid points of their characteristic curves; Fig. 5 is a diagrammatic illustraton of one form of receiving circuit which may be employed in the system of our invention; and Fig. 6 shows a modified form of receiving circuit embodying our invention.

Referring to Figs. 1 and 2 which show in schematic elevation and plan respectively one form of construction for a telegraph transmitter adapted to operate with the well-known cable code, 1 is a hollow drum driven at a constant speed by any suitable means and provided with a row of small pins 2 suitably spaced round the periphery to take the central driving holes of the usual telegraph signal or tape slip 3. On each side of the pins are cut rows of holes or slots 4 with their common longitudinal axis parallel to the shaft and passing through the pins. The holes or slots 4 are narrower circumferentially than the signal perforations 5 in the tape. A source of light 6 is mounted within or without the drum and arranged so that light may pass through the holes or slots 4 in the drum and impinge under the control of the signal tape 3 on either of a pair of light sensitive cells, such as photo-electric cells 7, one being for dots, the other for dashes. (Only one photo-electric cell is shown in the drawings). Interposed between the drum and the photo-electric cells are a pair of shutters 8, 9 and suitable optical apparatus 10 for condensing and directing the light. One of the shutters 8 is fixed, and the other 9 is adjustable the pair being arranged so that light falls on the cells through the inter-shutter space.

The action of the device is as follows:—

When a signal slip or tape is fed to the drum, if there are no signal perforations no light passes through the drum to the photo-electric cells. If a dot or dash is punched in the tape, the perforation allows light to pass through the drum. Owing to the revolution of the drum, the beam of light first impinges on one shutter, then passes on to the dot or dash photo-electric cell, between the shutters, and is eventually obscured from the cell by passing on to the second shutter. Owing to the fact that the slot or hole in the drum is narrower than the hole in the tape, the time at which the light is able to pass through to the photo-electric cell will be governed by the relationship between the aperture in the drum and the edge of the first shutter, and not by the edge of the signal perforation in the tape. Similarly the end of the signal is governed by the relationship between the aperture in the drum and the edge of the second shutter. Thus perforations in the tape merely select the signal and within the limits of the instrument the signals are regular and the time interval between preceding and succeeding signals is constant, irrespective of any irregularities in the tape perforations. By adjusting the gap between the shutters, any desired degree of "earthing" or "spacing"

from zero to 100% can be obtained. In operating a single telegraphic channel, it is important that the ratio $\frac{\text{marking time}}{\text{earthing time}}$ should be constant and it may be desirable to vary the ratio a definite amount to suit different cases. In particular, in multiplex operation, it is important to maintain this ratio constant, owing to the possibility of interference between telegraphic channels. For example, a multiplex system may comprise a plurality of transmitters, say three, coupled together mechanically or electrically so that each starts operation one third of a centre hole after its predecessor. If the "earthing" period of each transmitter is 66⅔%, i. e. "marking"=33⅓%, and the transmitter outputs are arranged to work into a common circuit, there will be three telegraphic channels of transmission, the whole of the line time being utilized. It will be obvious that if appreciable variation in the ratio $\frac{\text{marking time}}{\text{earthing time}}$ occurs, there will be overlapping between telegraphic channels.

In place of light, any convenient form of radiant energy may be used, for example, ultra-violet rays, infra-red or heat rays, very short radio rays, or air waves i. e. sound waves or supersonic waves. Where ultra-violet or infra-red rays are used as the form of radiant energy they may be caused to fall upon a photo-electric cell. In the case of ultra-violet rays, quartz lenses are preferred to glass for such optical systems as may be employed owing to the absorption power of glass. For heat rays, the receiving device may be any heat sensitive cell preferably a thermo couple or thermo junction.

In the case of radio waves, a wave length of the order of 1 meter, or less, is contemplated. The receiver may be constituted by a circuit, and comprise a coil or straight wire with an inductance at its centre tuned to the fundamental or to a harmonic of the transmitter.

In the case of sound or supersonic waves the source of radiant energy may comprise a magnetically driven reed or tuned diaphragm operated from a valve oscillator and from a harmonic thereof; or alternatively a piezo electric crystal operated electrically may be employed. The receiver may be constituted either by a tuned reed with diaphragm or the like which induces electromagnetically into a winding or circuit or by a condenser, one or more of whose plates vibrates or is tuned to vibrate under the stimulus of the air pressure waves. Such vibrations of course affect the dielectric and therefore alter the capacity of the condenser. The said alteration may be employed for example to vary the frequency of an oscillator, or in any other simple way. Alternatively a piezo electric crystal may be employed as receiver to develop potential which may then be amplified to any desired degree by thermionic valves.

One method of transmitting signals in accordance with this invention will now be described in connection with Fig. 3.

Referring to this figure 11, 12 are two photo-electric cells which are connected together on one side and on the other are connected each through a bias battery 13 or 14 to the grid 15 or 16 of one of a pair of thermionic valves 17, 18, arranged back to back and having their cathodes 19, 20 connected together. The grid sides of the cells are connected together through a resistance 21, the approximate mid point of which is connected to the common cathods lead and, through a battery 22, to the common photo-electric cell electrode lead. The output from the anodes of the valves is, after amplification if desired at 23, fed to the grids 24, 25 of a second pair of valves 26, 27, arranged back to back and with a common cathode connection 28. The anode circuits of these valves are completed from the common cathode lead through a common source 29 of alternating current of suitable frequency, thence each through the first primary 30 or 31 of a double primary transformer (having each a secondary 42 or 43) and through the primary 32 or 33 of a second transformer (each provided with a secondary 40 or 41) to the anode 34 or 35. The second primary 36 or 37 of each double primary transformer is connected to the alternating current source 29 and through a separate variable impedance 38 or 39 (which may if desired be constituted each by a thermionic valve) to the common cathode connection 28.

The secondaries 40, 41, 42 and 43 of all four transformers are connected in series, the juncture of the secondaries 42, 43 of the double primary transformers being connected to a lead 44 forming a common side to a pair of spark gaps 46, 47, and the juncture between the other secondaries 40, 41 being similarly connected to a lead 48 forming the other common side of the pair of spark gaps. The common sides of the spark gaps are connected together through a battery 49 and a choking system 45. These gaps may be of any type, rotary or stationary, or in vacuo, air, an inert gas or any other suitable fluid. The gaps may be provided with air blast and/or magnetic blast either steady or controlled by the photo-electric cells and, if desired, the electrodes may be water cooled. The gaps are provided each with a centre electrode 50 or 51 which is connected through a condenser 52 or 53 to that juncture of the secondaries not otherwise connected to the spark gaps. The said centre electrodes constitute the output and, for example, are connected between a submarine cable 54 and earth 54'. A choking system 55 or 56 is interposed between each centre electrode and its associated output terminal. The said choking system may conveniently comprise an inductance or a rejector circuit.

By the provision of suitable grid bias, the photo-electric cells may be arranged when illuminated to open or close the valves to which they are connected. Suppose illumination opens the valves:—

Now if the blank signal slip is passed through the transmitter so that neither cell is illuminated, the said valves, and therefore the second pair of valves, will be closed, and no alternating current will flow through the anode circuits of either of the said last mentioned valves. Alternating or pulsating current, however, will flow from the source through the circuits containing the variable impedances or valves 38, 39. Voltages will be induced in the secondaries of the double primary transformers thereby causing sparks to occur over the halves of both spark gaps from the "live" sides thereof to the central electrodes. The choking systems prevent these alternating current voltages from being impressed on the cable or going to earth. The cable is therefore put to earth through the "live" halves of the spark gaps during idle periods. When a signal occurs, one photo-electric cell is illuminated and its associated valve 17 or 18 is opened. Current then flows from the alternating current source round the anode circuit of one of the second pair of valves 26, 27. It should be understood that the primaries of each double primary transformer are joined in opposition and the current in one winding is adjusted by means of its associated variable impedance or valve 38, 39 to effect neutralization. Therefore no voltage is induced in the secondary of one of the double primary transformer, and the spark at one of the "live" half gaps ceases. The current in the primary of the other transformer in the "live" anode circuit induces a voltage in its secondary causing sparking at the other half of this gap. Since sparking still occurs at one of the "live" half gaps, a circuit is established from the cable via the spark gap battery to earth. A signal is therefore sent to line. When a dash occurs in the signal tape, the second photo-electric cell is illuminated and a similar series of events takes place, quenching the spark at the last mentioned half gap and establishing it at the associated other half gap. Thus the cable is put to earth with the battery in opposite polarity, so that a current of opposite polarity is sent to line. The condensers connected to the central electrodes prevent direct current passing through the secondaries of the transformers.

A modified arrangement, generally similar to that illustrated in Fig. 3 is shown in Fig. 4 of the accompanying drawings.

In the said Fig. 4, 57, 58, 59, 60, 45' are high impedance networks tuned to the frequency of the alternating current supply from the source 29. 61, 62, 63 and 64 are condensers serving to prevent direct current flowing in the transformer windings; 65 is a source of direct current; 66, 67 are choke networks serving to keep alternating current from the direct current source 65, and 68 a condenser serving to keep direct current from the alternating current source 29. 54 and 54' are the cable and earth connections respectively, and 69, 70, 71, 72, 73, 74, 75 and 76 are spark gaps.

In this modification it will be seen that the secondary windings of the transformers are separated from one another.

When, say, a dot signal is transmitted, sparks are quenched at gaps 69 and 70 and established at gaps 73 and 74, while still being established at gaps 71 and 72, in much the same manner as already explained in the preceding description. If, however, the sparks at gaps 69 and 70 are not quenched sufficiently quickly, a path for the current from secondary 41 would exist through condenser 62, networks 60 and 58, gaps 69 and 70, battery 49, network 45', and gap 74, and a spark might never be established at 73 to permit the direct current to enter the cable 54. To guard against this possibility, one or more of the high impedance networks 58, 60 and 45', tuned to the frequency of the alternating current supply, are provided. The networks 57 and 59, with 45', serve a similar purpose.

If desired, in place of providing a source of direct current 65 in the plate circuits of valves 26, 27, the impedances 38 and 39 may include valves, serving to suppress half the cycle from the alternating current source 29 in the transformer primaries associated with them.

Again, if desired, in the arrangement illustrated in Fig. 3 in order to set the valves substantially on the mid-points of their characteristics the negative pole of a source 65 of direct current is connected to the common cathode lead 28 whilst the positive pole is connected to the anodes of the valves via suitable chokes or rejector circuits 66, 67, a blocking condenser 68 being interposed between the alternating current source 29 and the transformers the arrangement being in this respect similar to that shown in Fig. 4. In this case, of course, thermionic valves are not suitable for use as impedances 38, 39 in the circuits of the second primaries 36, 37.

For multiplex operation, any number of photo-electric cells may be connected across resistances and utilized in similar manner, the cells being controlled in pairs (dot and dash) by separate transmitters as already described. If desired each transmitter may have its own amplification and spark system, the gaps being joined in series.

For reception or retransmission to another cable the photo-electric cells are, of course, dispensed with, the input from line being connected direct or via a shaping network, across resistances, arranged in like manner to the resistance associated with the photo-electric cells in the apparatus hereinbefore described.

Thereafter the arrangement is substantially as in the said previously described apparatus.

The output of such a receiver may be connected to another cable or to any form of receiving apparatus, e. g. recorder, regenerator, automatic perforator or the like, or to a plurality of these in a multiplex system. Also in such a system a plurality of spark gap units may be employed, each unit being associated with one channel terminal or junction.

In the modification, illustrated in Fig. 5 which shows an arrangement suitable for controlling the operation of receiving apparatus, the anodes of the second pair of valves 26, 27 are connected each through the primary 32′ or 33′ of a transformer, thence through a common source of alternating current 29 to the common cathode lead 28. The secondaries 40′ 41′ of the transformers are connected in a series circuit from one secondary through two blocking condensers 63′ 64′ through the other secondary, and through two spark gaps 74′ 75′ in series back to the first secondary. A battery 49′ with a suitable choke or rejector circuit (not shown) at each end is shunted right across the two spark gaps and the juncture between the said gaps is connected to the juncture between the blocking condensers. The said juncture forms one output terminal, and an approximate mid-point tapping from the battery is connected through an inductance or rejector circuit 56′ to the other output terminal.

With this arrangement, in the absence of signals, there is no sparking at any of the gaps. When one valve is opened by a signal, a spark is established at one of the gaps. Similarly, a spark is established at the other gap when the other valve is opened, thus allowing direct current to pass from one half of the battery to the output circuit.

In a modification of this arrangement, illustrated in Fig. 6 the secondaries 40′ 41′ of the transformers are connected together at one end and are in series with one another, the remote ends of the said secondaries being connected together through a pair of spark gaps 74′ 75′ in series, and also, in a circuit branch in parallel with the spark gaps, through a dash selector mechanism 77 and a dot selector mechanism 78 in series, a choke or rejector circuit (not shown) being associated with each selector mechanism.

The juncture of the spark gaps and the juncture of the transformer secondaries are connected together through a blocking condenser 79 and the first mentioned juncture is connected through an alternating current choke 80 and a battery 49 to the point between the selector mechanisms.

What we claim is:—

1. A telegraph transmitter comprising in combination means for radiating light, light sensitive means in the path of said light, means located between said light radiating means and said light sensitive means for interrupting said light, telegraph tape associated with said interruption means for permitting or preventing light from falling upon said light sensitive means in accordance with the signals punched upon said tape, and adjustable means for limiting the period during which light may fall upon said light sensitive means.

2. A telegraph transmitter comprising in combination means for radiating energy, means sensitive to radiated energy located in the path of the energy from said radiating means, means located between said radiating means and said radiation sensitive means for interrupting the energy radiated from said former means, signal bearing means associated with said interruption means for permitting or preventing the passage of said radiated energy after it has passed through said interruption means, shutters interposed in the path of said radiated energy between said signal bearing means and said radiation sensitive means, and means for adjusting the relative position of said shutters.

3. A telegraph transmitter comprising in combination means for radiating light, light sensitive means in the path of said light, means located between said light radiating means and said light sensitive means for interrupting said light, telegraph tape associated with said interruption means for permitting or preventing light from falling upon said light sensitive means in accordance with the signals punched upon said tape, shutters interposed in the path of said light between said telegraph tape and said light sensitive means, and means for adjusting the relative position of said shutters.

4. A telegraph transmitter comprising in combination a lamp, a photo-electric cell in the path of the light from said lamp, a rotatable drum surrounding said lamp and between said lamp and said cell, telegraph tape, means for feeding said tape over said drum, holes in the periphery of said drum, corresponding to but of less effective width than the signal holes in said telegraph tape, shutters between said tape and said cell, and means for adjusting the relative position of said shutters.

5. A telegraph instrument comprising in combination a spark gap, a source of alternating current for rendering said gap "alive", and means for applying signal currents to said gap in opposition to said alternating current.

6. A telegraph instrument comprising in combination spark gaps, a source of alternating current for rendering said gaps "alive", and means for applying signal currents to said gaps in opposition to said alternating current.

7. A telegraph instrument comprising in combination a spark gap, a double primary transformer whose secondary is associated with said gap and whose primaries are wound in opposition, means for applying to one primary alternating current from a local source, and to the other signal derivatives.

8. A telegraph instrument comprising in combination spark gaps, and double primary transformers whose secondaries are associated with said gaps and whose primaries are wound in opposition, and means for applying to one primary of each transformer alternating current from a local source, and to the other signal derivatives.

9. A telegraph instrument comprising in combination a spark gap, a double primary transformer whose secondary is associated with said gap and whose primaries are wound in opposition, means comprising push-pull connected valves for applying to one primary alternating current from a local source, and to the other signal derivatives.

10. A telegraph instrument comprising in combination spark gaps, and double primary transformers whose secondaries are associated with said gaps and whose primaries are wound in opposition, and means comprising push-pull connection valves for applying to one primary of each transformer alternating current from a local source, and to the other signal derivatives.

11. A telegraph instrument comprising in combination spark gaps two of which are provided each with a central electrode, and double primary transformers whose secondaries are associated with said gaps and whose primaries are wound in opposition, and means comprising push-pull connected valves for applying to one primary of each transformer alternating current from a local source, and to the other signal derivatives.

12. A telegraph instrument comprising in combination light spark gaps and double primary transformers whose secondaries are associated with said gaps and whose primaries are wound in opposition, and means comprising push-pull connected valves for applying to one primary of each transformer alternating current from a local source, and to the other signal derivatives.

In testimony that we claim the foregoing as our invention we have signed our names this ninth day of December, 1927.

WILLOUGHBY STATHAM SMITH.
NORMAN WILLIAM McLACHLAN.
WILLIAM GORDON REED JACOB.